(12) United States Patent
Margalit

(10) Patent No.: US 6,990,767 B1
(45) Date of Patent: Jan. 31, 2006

(54) MOUSE TRAP

(76) Inventor: Zamir Margalit, 1077 River Rd., Apt 709, Edgewater, NJ (US) 07020

( * ) Notice: Subject to any disclaimer, the term of this patent is extended or adjusted under 35 U.S.C. 154(b) by 132 days.

(21) Appl. No.: 10/679,137

(22) Filed: Oct. 3, 2003

(51) Int. Cl.
A01M 23/02 (2006.01)

(52) U.S. Cl. .......................................................... 43/61
(58) Field of Classification Search .................... 43/60, 43/61

See application file for complete search history.

(56) References Cited

U.S. PATENT DOCUMENTS

| 9,336 | A | * | 10/1852 | Neill | 137/48 |
|---|---|---|---|---|---|
| 74,264 | A | * | 2/1868 | Zaiser | 43/61 |
| 107,647 | A | * | 9/1870 | Bachman | 43/61 |
| 253,907 | A | * | 2/1882 | Andre | 43/61 |
| 305,664 | A | * | 9/1884 | Bryan | 43/61 |
| 383,972 | A | * | 6/1888 | Mittler | 43/61 |
| 897,302 | A | * | 9/1908 | Olson | 43/61 |
| 909,797 | A | * | 1/1909 | Hicks | 43/61 |
| 971,530 | A | * | 10/1910 | Draper | 43/61 |
| 986,010 | A | * | 3/1911 | Kennedy | 43/61 |
| 1,243,088 | A | * | 10/1917 | Mazurek | 43/61 |
| 1,255,798 | A | * | 2/1918 | Schuckman | 43/61 |
| 1,297,893 | A | * | 3/1919 | Nash | 43/61 |
| 1,345,716 | A | * | 7/1920 | Sudul | 43/61 |
| 1,382,416 | A | * | 6/1921 | Dresser | 43/61 |
| 1,399,630 | A | * | 12/1921 | Livezey | 43/61 |
| 1,406,028 | A | * | 2/1922 | Keller | 43/61 |
| 1,453,795 | A | * | 5/1923 | Hovell | 43/61 |
| 1,461,681 | A | * | 7/1923 | Schuckmanm | 43/61 |
| 1,735,786 | A | * | 11/1929 | Pearl | 43/61 |
| 1,747,108 | A | * | 2/1930 | Evans | 43/61 |
| 1,759,048 | A | * | 5/1930 | Fisher | 43/61 |
| 2,478,605 | A | * | 8/1949 | Symens | 43/61 |
| 2,510,168 | A | * | 6/1950 | Caldwell et al. | 43/61 |
| 2,524,504 | A | * | 10/1950 | Woolworth | 43/61 |
| 2,541,681 | A | * | 2/1951 | Andrews | 43/61 |
| 2,599,017 | A | * | 6/1952 | Rogers | 43/61 |
| 2,608,018 | A | * | 8/1952 | Tyler | 43/61 |
| 2,620,589 | A | * | 12/1952 | Jones | 43/61 |
| 3,585,750 | A | * | 6/1971 | Routt | 43/61 |
| 4,310,984 | A | * | 1/1982 | Brubaker, Jr. | 43/61 |
| 4,763,439 | A | * | 8/1988 | Smith | 43/61 |
| 5,199,210 | A | * | 4/1993 | Nastas | 43/61 |
| 5,345,710 | A | * | 9/1994 | Bitz | 43/61 |
| 5,615,514 | A | * | 4/1997 | Meade, Jr. | 43/61 |
| 6,202,340 | B1 | * | 3/2001 | Nieves | 43/61 |
| 6,484,436 | B1 | * | 11/2002 | Chang | 43/61 |

* cited by examiner

Primary Examiner—Teri P. Luu
Assistant Examiner—Jordan Lofdahl
(74) Attorney, Agent, or Firm—Benjamin Appelbaum

(57) ABSTRACT

An animal trap comprises a trap body with a sliding trap door at one end. A bait holder is pivotably mounted on the top of the trap body, the top including an opening through which the bait holder is inserted into the trap body. The bait holder is connected to a trip mechanism, which includes a rod having a ball mounted thereon. The ball is positioned towards the front end of the trap, the ball being a support mechanism that balances the trap door in an open position. When an animal enters the trap and takes the bait, the bait holder is pivoted, moving the trip mechanism to upset the balance of the trap door on the rod, thereby closing the trap and retaining the animal therein.

29 Claims, 5 Drawing Sheets

MOUSE TRAP

FIELD OF THE INVENTION

The present invention relates to traps for catching animals. In particular, the present invention relates to a trap for catching rodents. The animals are trapped alive, providing the user with the option to release the trapped animal into the wild, or to kill it, such as by drowning.

BACKGROUND OF THE INVENTION

Numerous types and styles of rodent and animal traps have been developed and described in the extensive prior art. The traps can be categorized as those which trap and kill the animal; those which have specifically been used to trap rodents, or those which trap the animal alive, leaving the disposition of the animal up to the user.

Several references illustrate different types of closure mechanisms. Morelli (U.S. Pat. No. 1,630,798) and Price (U.S. Pat. No. 2,454,476) show a slide means to close the trap.

Zaiser (U.S. Pat. No. 74,264) operates by means of a bait hook and an external door release mechanism. Schuckman (U.S. Pat. No. 1,255,798) discloses a trap having a bait bucket balancing a lever which controls the movement of a sliding door. Fisher (U.S. Pat. No. 1,759,048), Griffin (U.S. Pat. No. 1,648,765), Pendry (U.S. Pat. No. 2,163,961) and Stilborn (U.S. Pat. No. 2,586,110) are also examples of a trigger mounted in the upper part of the trap, and connected to a sliding trap door.

Kelley (U.S. Pat. No. 6,164,008) discloses a trap having an internal trigger mechanism connected to an external closure mechanism.

Cannon (U.S. Pat. No. 862,446), Erickson (U.S. Pat. No. 1,327,229) and Dresser (U.S. Pat. No. 1,383,416) demonstrate spring-operated trap doors.

Lowrance (U.S. Pat. No. 1,170,649) discloses the use of a ball seated in a notch as part of the trap setting mechanism.

Buttles (U.S. Pat. No. 26,883) discloses supporting the trap door on uprights. Pead (U.S. Pat. No. 443,975) supports the trap door on an extension rod, inside the trap. Similar mechanisms are illustrated by Livezey (U.S. Pat. No. 1,399,630), Senecal (U.S. Pat. No. 1,654,434), Hayden (U.S. Pat. No. 2,181,551) and Symens (U.S. Pat. No. 2,478,605).

Hayden (U.S. Pat. No. 2,181,551) and Heldman (U.S. Pat. No. 2,216,644) illustrate trap doors containing notches to receive a trip rod.

Goostrey (U.S. Pat. No. 2,460,417) shows a bait hook suspended from an opening in the top of the trap, but whose trap door works in a manner opposite to that of the present invention.

Long (U.S. Pat. No. 4,270,299) discloses a trap, comprising a box propped up by a stick and connected to a string which is attached to the other side of the box, and which string is placed over a mouse trap.

Kao et al. (U.S. Patent Application Publication No. US 2003/0019148 A1 discloses a spring-loaded closure mechanism connected to a bait hook, but which operates in a manner that is distinctly different from that of the present invention.

In U.S. Pat. No. 742,953 Alphin discloses a trap that is intended to be partially buried when used, with two sets of one-way trap doors, such that it can be used to trap animals from above ground, such as rodents, or moles which are tunneling below ground.

Specifically, Buttles (U.S. Pat. No. 26,883) discloses a cage trap in which a sliding door is held open by a small pin projecting from the front bar and passing through a hole in the door. Upright bars extend just above the door when raised, and are operated by the tipping down of the trap. As the upright bars are thrown back by the tipping of the trap bottom, they strike the lower edge of the door and throw it off the pin, releasing the door to slide down.

Zaiser (U.S. Pat. No. 74,264) discloses an animal trap with a sliding door connected to the bait hook. The upper part of the door contains an opening, through which opening a setting rod passes. The setting rod is supported upon a fulcrum, composed of a curved spring plate which is biased towards the door. When the bait is taken, detaining hook moves away from setting rod, causing the setting rod to be moved by the spring in the direction of closing the door, trapping the animal therein.

Bachman (U.S. Pat. No. 107,647) discloses an animal trap in which the door is held in the open position by threads which are attached to the bottom of the trap. Threads are passed over rear end of a lever, which is pivotably supported between uprights, the front end of the lever being attached to the door by a ring. To operate, this trap requires the animal to gnaw on threads, and only when the threads are gnawed through sufficiently will the lever be shifted from its open position, and door will drop to trap the animal within the trap.

In U.S. Pat. No. 443,975 Pead discloses a trap in which a bait hook is suspended from transverse wire rod, suspended from the trap top. A sliding gate contains an orifice, into which is inserted an end of a trigger bar, supporting the gate in the open position. When an animal touches the bait, the end of trigger bar is dislodged and the gate is released to close the trap.

Skinner (U.S. Pat. No. 451,163) discloses a release mechanism (FIG. 2) in which vertically sliding doors include longitudinal openings through which extend projections, against which bear the upper ends of springs. The upper ends of the doors are connected by a rod, and a prop bar is attached between the ends of the rod. When the trap is set and the doors are elevated, prop bar is supported on a lever above the pivotal point. When an animal takes the bait, one end of lever is pulled upon and depressed, forming an inclined plane, down which slides the prop bar and the sliding doors are released.

Cannon (U.S. Pat. No. 862,446) discloses a release mechanism wherein a spring-wire is coiled about a pin or projection and one end of spring wire engages the projection on the side of the cage, and the other arm engages a projection extending from the inside of the sliding door. The door is held open by a latch which is slidably mounted in guides secured to the trap floor. When the animal pulls on the bait, the bait-holder is rocked, withdrawing the latch from the door and permitting the door to close under the influence of the spring.

In U.S. Pat. No. 986,010 Kennedy discloses a trap having a sliding door supported by a pulley. The release mechanism includes an end of cable which holds the door, and forms a loop which is placed around a spring member. When taking the bait, the animal applies pressure to the trigger mechanism, causing spring member to snap from under spring member, which is held to trigger by pin, thereby causing the loop to leave spring member, and the door to close.

In U.S. Pat. No. 1,327,229 Erickson discloses a trigger mechanism, elements of which are outside the trap. A twisted standard is in communication with a treadmill which will provide bait. As the animal rotates the treadmill, the standard is drawn out of engagement with a bracket, which bracket is urged downward at its opposite end by a spring, releasing the door to entrap the animal.

Dresser (U.S. Pat. No. 1,382,416) discloses a trap with a door being slidably mounted within spaced vertical guides, and a trigger mechanism. The trap works in two stages, and employs two different mechanisms to keep the door open. In its first stage, that of "training" the animal to get used to the trap, the door is held open by a bolt positioned within aperture of the door; the bolt is spring controlled.

After the animal has been acclimated, the second stage involves actual use of the trap to entrap the animal, using a second trigger mechanism that includes a treadle connected to a sliding pin; when the treadle is depressed by the weight of an animal, the pin is removed from an aperture in the door. The treadle includes a pair of ears pivotably connected to links to an arm of ball crank lever. The other arm of ball crank lever is joined to sliding pin. A spring urges the door to its closed position when sliding pin has been withdrawn from the door.

In U.S. Pat. No. 2,454,476 Price discloses an animal trap with a stationary door secured to the base of one chamber. When the bait-holding tilting pan is tripped, spring-activated chamber is released from trapping mechanism, and the chamber is rotated by action of tension spring to bring an opening in alignment with the stationary door, trapping the animal.

Roman (U.S. Pat. No. 2,748,526) discloses a tunnel-like chamber divided into compartments, with the bait box being mounted within the center section on a tilting platform. When the animal touches the platform, it releases an arm, which releases a member, allowing the plate to drop down under the force of a weight. The blade can either go through slots to close the chamber, or can be attached to flanges to kill the animal.

In U.S. Pat. No. 4,706,406 Mowatt et al. disclose a trap intended mainly for beavers and otters, and which is designed to be placed partially submerged. The trap has two gravity operated drop gates. The trap is set by means of a cocking mechanism.

Latches hold the gates in raised position when the trap is set, these latches are connected to transverse rods. The tripping mechanism includes two trip wires welded to and depending downwardly from a rotatable shaft, which extends across the center of the trap and is held by brackets joined below the center of the longitudinal rods. When an animal touches the trip wires, the shaft is rotated slightly, causing the rod to come free, and other shafts rotate slightly with the latches releasing both of the end gates simultaneously, which gates drop by gravity.

Wynn et al. (U.S. Pat. No. 4,912,872) discloses a release mechanism comprising a trip treadle connected to a pivot rod, which is pivotably mounted in hinges, actuating rod to move and remove end from its supporting engagement with door, which falls by gravity from its open position to a closed position.

In U.S. Pat. No. 1,170,649 Lowrance discloses a multi-chambered animal trap, divided by partitions with mirrored faces to attract animals into the trap. A trip plate is at the base of each chamber; a wire frame follows the contour of the base, and the corners of the wire frame have an upwardly opening guide socket. A flexible cord or chain rises through each socket, the chain having a ball provided at its inner end, the ball being adapted for seating within a notch in a flange which is supported on standards which rise from the base. The trap is set by raising the cage members, and seating the ball within the notch, thereby holding the trap in the set position.

When the animal steps on the trip plate, an arm and a pin are engaged and unseats the delicately poised ball from the notch, and the cage drops to trap the animal. A weight is positioned at the outer corner of each cage to insure a quick fall.

Long (U.S. Pat. No. 4,270,299) discloses a mouse trap comprising a transparent box hinged to its base and held open by a prop. A string is attached to the prop on one end and to the box side on the other end. A spring mouse trap is under the string, such that when a mouse trips the spring trap, hold down rod will strike the spring and instantly pull the prop out of the openings and the box will drop, trapping a mouse instantly.

Batman (U.S. Pat. No. 6,178,686 B1) discloses a skunk trap, the closure mechanism being a slicing closure door which closes by pivoting at one end to close the trap. A biasing member operates to bias the door towards the closed position.

Bachman (U.S. Pat. No. 107,647) discloses an animal trap in which the door is held in the open position by threads which are attached to the bottom of the trap. Threads are passed over rear end of lever, which is pivotably supported between uprights, the front end of lever attached to the door by a ring. To operate, this trap requires the animal to gnaw on threads, and only when the threads are gnawed through sufficiently will the lever be shifted from its open position, and the door will drop to trap the animal within the trap.

In U.S. Pat. No. 443,975 Pead discloses a trap in which a bait hook is suspended from transverse wire rod suspended from the trap top. A sliding gate contains a small orifice, into which is inserted an end of trigger bar, supporting the gate in the open position. When an animal touches the bait, the end of trigger bar is dislodged and the gate is released to close the trap.

Skinner (U.S. Pat. No. 451,163) discloses a release mechanism in which vertically sliding doors include longitudinal openings through which extend projections, against which bear the upper ends of springs. The upper ends of the doors are connected by a rod, and a prop bar is attached between the ends of the rod. When the trap is set and the doors are elevated, the prop bar is supported on a lever above the pivotal point. When an animal takes the bait, one end of the lever is pulled upon and depressed, forming an inclined plane, down which slides the prop bar and the sliding doors are released.

In U.S. Pat. No. 986,010 Kennedy discloses a trap having a sliding door supported by a pulley. The release mechanism includes a cable end holding the door, the cable end forming a loop which is placed around a spring member. When taking the bait, the animal applies pressure to a trigger mechanism, causing a spring member to snap from under a second spring member, which is held to the trigger by a pin, thereby causing the loop to leave spring member, and the door to close.

In U.S. Pat. No. 1,139,849, Collins discloses a trap comprising a sliding door in guides. A trip plate located on the trap bottom, when depressed comes in contact with and depresses rock shaft, transferring motion to the latch mechanism to withdraw the latch pin from the door, and permit the door to close. The lower edge of the door rests on the latch pin.

In U.S. Pat. No. 1,399,630 Livezey discloses a release mechanism, wherein a gate slides vertically between two pairs of spaced guides. A rod is bent at its rear end to form trigger; first end of rod is positioned beneath the shoulder on the gate. Inner end of a nail forms the shoulder; the nail is used to raise the gate from the outside. When a rodent takes the bait, the rod will be moved, and will shift the end from engagement with the shoulder, thereby permitting the gate to close by gravity and trap the animal.

In U.S. Pat. No. 1,648,765 Griffin discloses a release mechanism wherein baited hook passes through the top of the trap, where it is pivotably attached to a crossbar, and when the hook is moved, looped portion is removed from a detent in the trap door, which then falls via gravity.

Senecal (U.S. Pat. No. 1,654,434) discloses a board having an opening with a cutaway at its upper end. The door slides along board, and includes a central pin for raising or lowering the door. The bait hook is connected by a rod to a plate, and the lower edge of the door rests on a portion, and when bait is applied, an extremely slight movement of the strip thus provided will cause the movement of a plate, loosely suspended from pin, and this movement will release the door, allowing it to fall by gravity.

In U.S. Pat. No. 1,735,786 Pearl discloses a trap door being slidably mounted in channels for up and down movement. When the bait holder is moved from its set position by a rodent nibbling on the bait, a latch rod is disengaged from a shoulder means, causing elastic bands to quickly close the trap door.

Fisher (U.S. Pat. No. 1,759,048) discloses a trigger mechanism. The door is connected by a cable at one end, the rear end of the cable is connected to the trigger via a cable. The trigger has a notch which engages the margin of an aperture in the top of the bait chamber. When the animal nibbles the bait, the trigger is dislodged from the margin, causing the door to close by gravity.

In U.S. Pat. No. 1,850,634 Pairo discloses an animal trap having guides in which a vertically sliding closure operates. Lug on inner surface is urged by spring to keep closure open. Treadle is connected to lug by means of two rods which pass through the top of trap and pivotably connect with a latch which is connected by a link to bolt.

Burnley (U.S. Pat. No. 1,963,435) discloses a rat trap that includes a sliding door mounted in guides. The door is provided with a lug on its inner side which is engaged by hook or latch, connected to an end of trip arm or lever. The trip arm is pivoted near the end wall by a pin mounted in the body, and the lever is weighted. When the trigger is released, a member drops under the influence of spring, such that the trip lever becomes unsupported, causing the door to be slightly raised until short end of the lever clears the lug, whereupon the door will drop by gravity.

In U.S. Pat. No. 2,163,961 Pendry discloses a trap door that slides vertically in grooves. A housing contains a hole in its top, through which a finger slides up and down. The finger has a notch which engages a plate on the top of the housing. The finger is connected by a bar to the trap door, and a spring acts on the finger/bar mechanism. A post acts as a fulcrum for movement of the bar. When an animal takes bait, the trigger is moved, moving notch out of engagement with a plate at which time the gravity of the trap will cause it to fall and the bar will be moved to the closed position.

Hayden (U.S. Pat. No. 2,181,551) discloses a trap which can capture animals alive, but is also equipped with a bar or lever to kill the animal, such as a rodent. The sliding door may be provided with a small notch in its lower end to rest upon the end of the longitudinal rod. The trigger member is a loop formed to effectively block the entrance to the bait chamber, but when moved, displaces longitudinally extending rod, whose other end is supporting the door in the open position, either by the door resting upon the rod, or with the rod being received in the door notch, causing the door to drop and entrap the animal.

In U.S. Pat. No. 2,216,644 Heldman discloses a trap having a vertically sliding door which is movable in position obstructing the entrance opening of the chamber, and also is movable vertically into a nonobstructing position. The door includes a vertically extended T-shaped opening comprising a vertically positioned slot terminating in horizontally positioned slots formed in the door, the slots being centrally located whereby the horizontally extending branches of the T-shaped latch element are positionable. When the treadle is in the normal position, the T-shaped latch element engages one of slots, but when the treadle is moved, the element is disengaged therefrom, allowing the door to drop.

Goostrey (U.S. Pat. No. 2,460,417) discloses a trigger mechanism, wherein bait on a hook is suspended from a cork mounted in a hole on top of the trap. To re-bait, the cork is withdrawn from the opening. A plate is vertically slidable, and has an opening that corresponds to and aligns with an opening when the trap is set. When the trap is sprung, a spring causes the door to be moved upwards, as cross-over portion acts on ledge or shoulder of plate, in a manner that is opposite to that described for the present invention.

Symens (U.S. Pat. No. 2,478,605) discloses an internally positioned trigger mechanism. When the animal tries to take bait from the hook, a rod is drawn rearwardly, withdrawing its tip from its position supporting the sliding door, allowing the door to fall and caging the animal, Stillborn (U.S. Pat. No. 2,586,110) discloses a trigger mechanism in which gates are connected by cables to a trigger which is connected to a treadle by means of trigger rod. The gates are raised by looping one end of the cable over the lever arm end of the trigger. When the treadle is depressed, trigger rod is lowered and rotates to a position approaching the horizontal, slipping the cable ends and allowing the gates to drop.

Gardner (U.S. Pat. No. 2,752,722) discloses a release mechanism, such that when a rodent bites the head of the trigger pin, the trigger pin is pulled inwardly, causing the trigger bar to be released, allowing the trap door to close.

In U.S. Pat. No. 2,475,462 Rosen discloses a trap door slidably mounted in flanges, and which is retained in an upward position, based on how the trap is balanced on a transverse pivot located underneath the trap. When an animal enters the trap, its weight causes a shift, causing the trap door to drop, and which is held in place by a user-operated latch.

Giacoletto (U.S. Pat. No. 2,574,780) discloses a trap comprising multiple chambers for trapping animals. Each trap includes a vertically movable closure gate in guide strips and vertical strips. A depending rod is frictionally disposed within an opening in a rotor, which pivotably connects at its lower end to a link bar. The link bar receives a crank end of a crank shaft, which crank shaft connects to a bait arm. When a rodent engages the bait and pulls downwardly, the crank shaft will be rocked and the rod pulled to rotate rotor and swing pintle away from wall, releasing the gate and trapping the animal.

In U.S. Pat. No. 5,778,594 Askins et al. discloses a collapsible animal trap having two trap doors, one on each end, and which are controlled by a trigger mechanism mounted on the top of the trap. A trip pan in the base of the trap is connected by cables to the trigger mechanism, such that when an animal steps on the trip pan, the trip pan pivots in one or other directions, causing one or other of the cables to pull on its respective cam member arm thereby rotating the cam member somewhat in a clockwise direction. This movement causes the cam surfaces to release the inner ends of the rods which then spring inwardly towards the cam member so that the outer ends of the rods are released from the apertures in the doors thereby allowing the door to slide closed and trap the animal. The trigger mechanism is mounted on the top of the trap.

Conover (U.S. Pat. No. 5,867,934) discloses a release mechanism, comprising a swingingly mounted removable bait holder having a J-shape. A hinge element is sized to fit over the bait holder hanger. When the trap is set, a knob is pushed toward a header, causing trap door supporting segment to extend, supporting trap door. When the animal takes the bait, movement of the bait holder pushes knob in such a manner that door supporting segment is removed from under door, causing trap door to fall.

In the Conover invention, the bait holder can be removed from the trap for re-baiting, but this can only be accomplished by removing the wire mesh cover, whereas in the present invention the trap can be rebaited without removing the bait holder from the trap.

In U.S. Pat. No. 6,164,008 Kelley discloses a release mechanism that is mounted outside of the trap and connected to a trip pad on the inside of the trap. The trap includes a door slidably mounted for up and down movement within guides. The invention has a crank bell wheel which rotatively translates a vertically directed force exerted upon trip link into a horizontally directed force which, compressing spring, and urging set and lock rod out of engagement with an opening in the door, allowing the trap to close.

Thus, the prior art illustrates a number of different types of traps, having different doors and door configurations; having different types of trip mechanisms, both within and external to the trap; different ways of trapping the animal alive or dead, and for trapping one or more animals therein. But as will be shown in this specification herein, the combination of sliding door mechanism, bait holder, and trip mechanism is not shown or taught by the prior art.

The present invention is a mouse trap designed to trap the animals alive, so that they can be released elsewhere, or immersed in water and drowned prior to disposal. The trap is box-like, being fabricated from plastic, with a sliding trap door at one end. The trap has an opening in its top surface, through which a bait holder is suspended. The bait holder is also box-like, being positioned towards the back of the trap. The bait chamber has an opening on one side, allowing an animal to take the bait, and the bait chamber is open at the top. The bait holder can be filled by inserting bait into the bait chamber using an opening in the top of the trap, or inserting it through the open trap door. The bait holder is pivotably connected to a trip mechanism, which includes a prop mounted towards the end positioned near the trap door. The prop is thus positioned towards the front end of the trap, where it acts as a support mechanism to prop the trap door in the open position.

The trap door is notched, and, when the trap is set, the trap door is balanced upon the prop. When an animal takes the bait from the bait chamber, the trip mechanism is moved, moving the prop from under the trap door, and causing the door to drop and trap the animal within the trap.

This inventor has found that the present invention is particularly useful for trapping field mice. Because these mice are small, with their small size and weight, this inventor has found that they avoided being trapped using a conventional, spring-loaded traps. These mice were able to take the bait from the conventional trap without tripping the trap, but were successfully captured using the present invention.

BRIEF SUMMARY OF THE INVENTION

An object of the present invention is to provide a trap that can be used to capture a variety of animals.

Another object of the present invention is to provide a trap that can be used to capture small rodents.

Yet another object of the present invention is to provide a trap in which the user has the option to release the trapped animal, or to kill it.

Another object of the present invention is to provide a trap that can be produced from a variety of different materials, and produced in a variety of different sizes, so as to be usable with different animals.

Another object of the invention is to provide a trap that is economical to manufacture, yet sufficiently durable as to be reusable.

Yet another object of the present invention is to provide a trap that can be considered disposable.

The present invention is an animal trap comprising a trap body with a sliding trap door at one end. A bait holder is pivotably mounted on the top of the trap body, the top including an opening through which the bait holder is inserted into the trap body. The bait holder is connected to a trip mechanism, which includes a rod having a ball mounted thereon. The ball is positioned towards the front end of the trap, the ball being a support mechanism that balances the trap door in an open position. When an animal enters the trap and takes the bait, the bait holder is pivoted, moving the trip mechanism to upset the balance of the trap door on the rod, thereby closing the trap and retaining the animal therein.

DETAILED DESCRIPTION OF THE INVENTION

Figure 1:
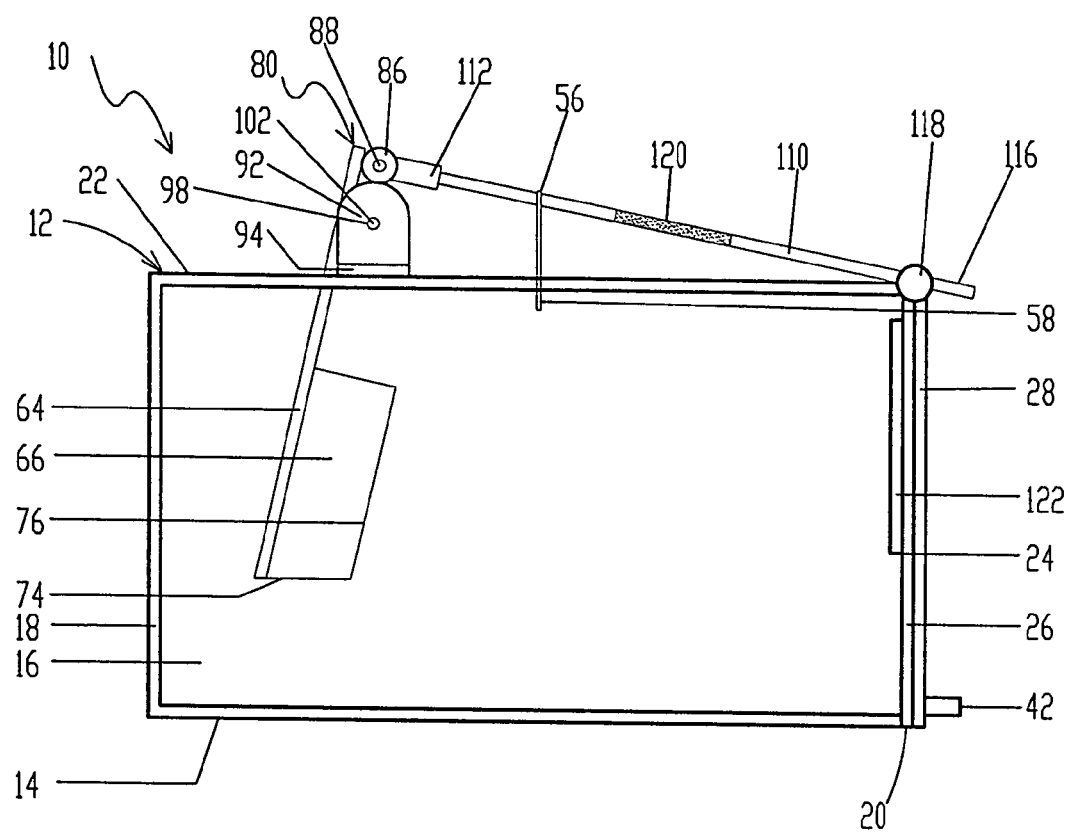
FIG. 1 is a side view of an embodiment of the present invention.

An embodiment of the present invention is shown in FIG. 1, as trap 10. The trap 10 comprises a body 12 which includes a bottom member 14, side members 16, ends 18 and 20, with end 18 being the back end and end 20 being the front end. The trap includes top member 22. In the embodiment shown in FIG. 1, the trap has a generally rectangular body, but other configurations, such as tubular, oval, partially circular or the like are also feasible and are considered to be within the scope of the present invention.

The bottom member 14, side members 16, rear end 18 and top member 22 are generally flat.

Front end 20 (shown in greater detail in FIG. 2) comprises a first support 122, which is attached inside a slot 24 formed in each side of the side members 16 at their end 20. A pair of spacers 26, are attached external to first support 122. External to the spacers 26 and attached thereto is a retaining piece 28, which includes a pair of downwardly extending legs 30. Within the body of retaining member 28 is a notched region 32. Notch 32 functions as a stop means to limit the upward movement of trap door 40 by engaging lift knob 42 when it slidably moves within notch 32. A second notch 36 is present along the top portion of retaining member 28, and, as will described later, allows for movement of the trip mechanism 110 and setting of the trap door 40. An entrance 38 is formed when the trap door 40 is moved to its upward position.

Figure 3:
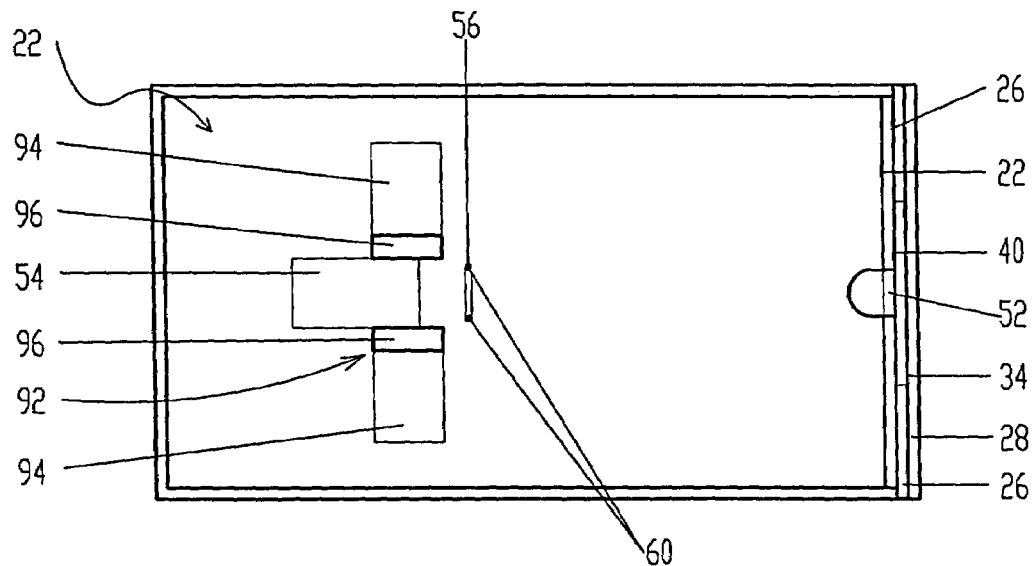
FIG. 3 is a top view of an embodiment of the present invention, shown without the bait holder and trip mechanism.

The spacers 26 form a gap 34 between the front end 20 and the retaining piece 28, allowing trap door 40 to slidably move up and down therein (FIG. 3).

Figure 2A:
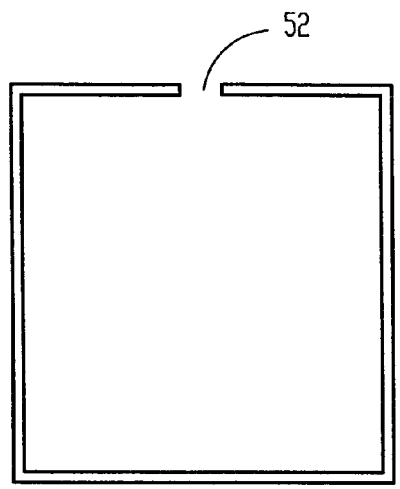
FIG. 2A illustrates the front end of the trap body.
Figure 2B:
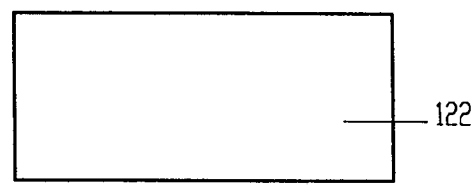
FIG. 2B illustrates the first support, which is joined towards the front end of trap body.
Figure 2C:
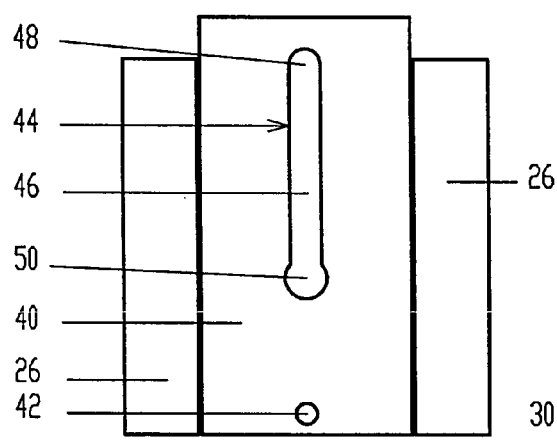
FIG. 2C illustrates the trap door and the spacers which separate the trap door from the first support and the front end of trap body.
Figure 2D:
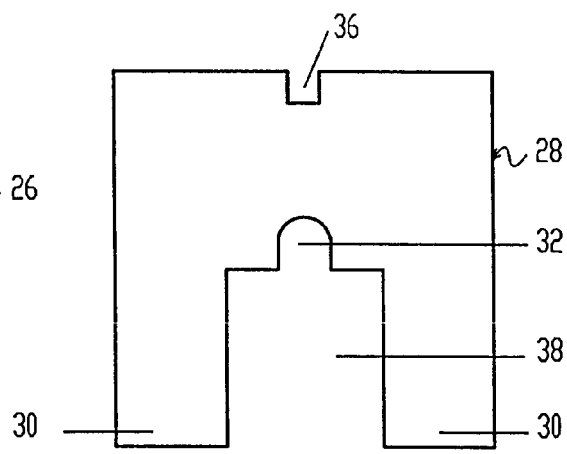
FIG. 2D illustrates the retaining piece, between which retaining piece and spacers the trap door moves.

Trap door 40 comprises a lift knob 42 attached to its outside surface, and a channel 44 (FIG. 2C). The channel is defined by a longitudinal slit 46 that is bordered by arcuate ends 48 and 50, the upper, or first end 48 being smaller in diameter than the lower, or second end 50.

Top member 22 is generally flat, and includes a notched opening 52 at its front, and a second opening 54 towards its back. Notched opening 52 joins second notch 36, allowing for movement of the trip mechanism 110. Second opening allows for movement and loading of the bait chamber 66 (FIG. 3).

A retaining means 56 is attached to top member 22 between the openings 52 and 54. In the embodiment shown herein, retaining means 56 is a metallic loop, and is attached by an adhesive after passing a portion of its lower members 58 through the openings 60 formed in top member 22. Alternatively, retaining means 56 can be a metal loop having threaded ends, inserted through openings 60, and held in place by fasteners such as a nut or the like. The retaining means 56 can also be attached by means of adhesives, epoxies, welding, soldering, or other means of joining and/or attachment, as known to those skilled in the art, the means of attachment also being dependent upon the materials of which the top member 22 and the retaining means 56 are made, such as from other metals, plastics, composites, or the like. Retaining means 56 limits the upward movement of the trip mechanism 110.

Figure 4:
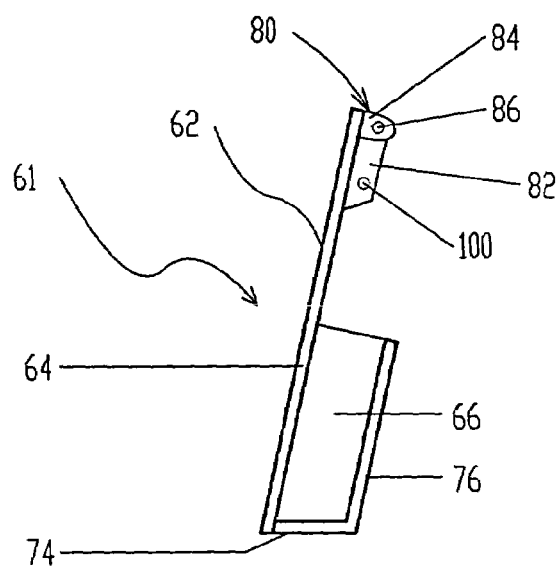
FIG. 4 is a side view of the bait holder.
Figure 5:
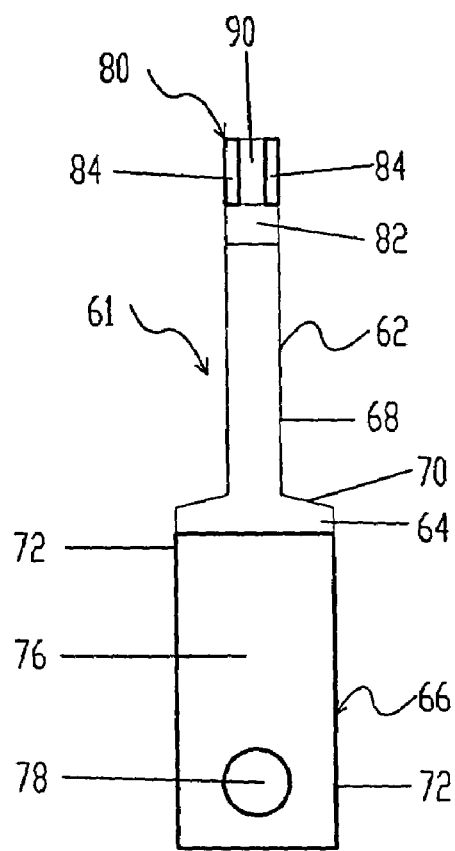
FIG. 5 is a front view of the bait holder.
Figure 6:
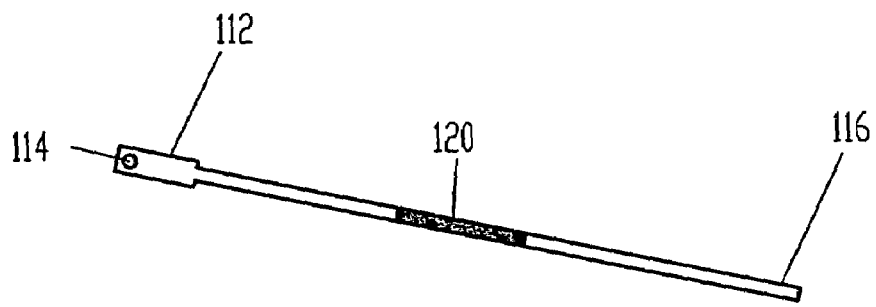
FIG. 6 is a side view of the trip mechanism.
Figure 7:
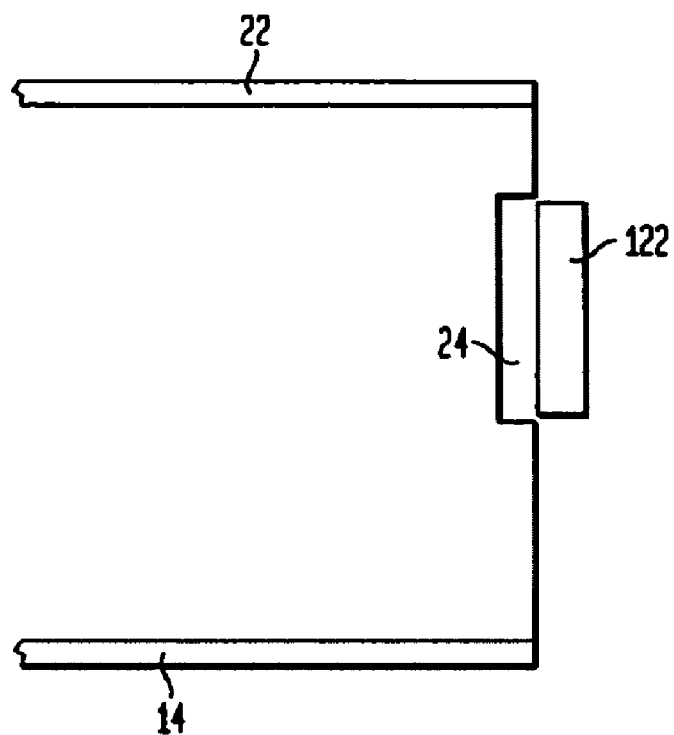
FIG. 7 is an exploded, partial side view of the embodiment shown in FIG. 1, showing the slot in the side of the trap and the spacer bar.

Attached to the top member 22 proximate the second opening 54, and extending through the second opening 54 is bait holder 61. Bait holder 61 comprises an elongated body 62 including a wide portion 64 which forms the back member 64 of bait chamber 66, and a narrow portion 68 connected to the wide portion 64 by a tapered portion 70 (FIGS. 1, 4–5).

Bait chamber 66 further comprises a pair of side members 72, a bottom member 74, and front member 76. Bait chamber 66 is open at the top, and front member further includes an opening 78 from which opening 78 an animal can take the bait (not shown). The bait can be any type of bait that is appropriate for the animal being trapped. Thus, for rodents, for example only and not intended as any limitation, the bait can be selected from crackers, peanut butter, grains such as corn, rice or wheat, or other bait items known to those skilled in the relevant art. The open top allows the bait to be inserted into the bait chamber 66, which can be done either by opening the trap door 40 and filling the bait chamber from inside the trap, or applying the bait through the second opening 54 in top member 22. Most users will probably find it easier to insert bait into bait chamber 66 by filling it from the inside through the open trap door 40.

Narrow portion 68 of bait holder body 62 includes a trip mechanism receiving means 80 and a boss 82 proximate its distal end (i.e., the end that is furthest from the bait chamber 66). Trip mechanism receiving means 80 includes a pair of walls 84, each wall containing an opening 86, through which opening is placed a first pivot pin 88 to pivotably receive the first end 112 of trip mechanism 110 in the gap 90 between the walls 84.

Attached to top member 22 is a pair of mounting brackets 92, mounting brackets 92 being positioned on each side of second opening 54. Each mounting bracket 92 includes a base 94 and an upright 96, each upright including an opening 98 therein. Boss 82 contains an opening 100, and the openings 98 and 100 are aligned such that bait holder body 62 is pivotably joined to the mounting brackets by means of a pivot pin 102 inserted through the openings 98 and boss 82.

Between the bait holder 58 and the trap door 40 is a trip mechanism 110. Trip mechanism 110 is a rod which is inserted through retaining means 56; the trip means first end 112 is pivotably received within trip mechanism receiving means 80. First end 112 is shaped and sized so that it can be received within boss 82. In the embodiment shown herein, first end 112 is flat, and includes an aperture 114 through which first pivot pin 88 is inserted. Second end 116 extends past the retaining piece 28, and a prop 118 is attached to the trip means towards second end 116. Prop 118 is positioned within second notch 36 in retaining means 28, where it supports the trap door 40 when the trap door 40 is in the open position. Trip mechanism 110 is a hollow rod into which a small weight 120 has been inserted. Alternate embodiments of the trip mechanism can employ solid rods, bars, wire, or equivalents thereof.

In the embodiment shown herein, prop 118 is frictionally retained on trip mechanism 110, but in other embodiments prop 118 is threadably attached to the trip mechanism, or retained by means of a fastener such as a nut and bolt, adhesives, or other means of attachment known to those skilled in the art.

In use, the trap is baited, placed in the desired location, and set. To set the trap 10, the trap door 40 is slid to its uppermost position, and prop 118 is placed within channel 46, within first end 48, such that the trap door 40 is balanced on top of prop 118. The trap is ready for use. When an animal enters the trap through entrance 38, it proceeds towards the bait holder 58 suspended near the back of the trap. As the animal takes bait from bait chamber 66, movement of the bait chamber 66 moves trip mechanism 110, disrupting the balance of trap door 40 on prop 118, causing trap door 40 to fall rapidly, and thereby trap the animal within trap 10.

This inventor has found that the present invention is particularly useful for trapping field mice. Because these mice are small, with their small size and weight, this inventor has found that they avoided being trapped using a conventional, spring-loaded traps. These mice were able to take the bait from the conventional trap without tripping the trap, but were successfully captured using the present invention.

After the animal has been trapped, with the trap door 40 closed, water can be poured into the trap through the openings in the top 22 and the trapped animal drowned. Alternatively, one can release the trapped animal.

Embodiments of the present invention can be manufactured using inexpensive materials, thus making the trap disposable if a user does not want to deal with the trapped animal or reusing the trap.

In the embodiments shown herein, the trap has been manufactured from plastic, and the various components have been joined using an appropriate adhesive.

The present invention is a lightweight trap, manufactured from a transparent plastic, such as polycarbonate, polypropylene, or other materials. However, materials such as polyvinyl chloride ("PVC"), or other plastics, or other materials, including composites of plastics with other materials, or metals such as steel, stainless steel, aluminum, wire or wire mesh, or the like can be substituted for a transparent plastic. The size of the trap can be scaled up to accommodate large animals, provided that the materials used in its construction are sufficiently strong to retain the trapped animal therein.

Therefore, although this invention has been described with a certain degree of particularity, it is to be understood that the present disclosure has been made only by way of illustration, and that numerous changes in the details of construction and arrangement of parts may be resorted to without departing from the spirit and scope of the invention.

I claim:

1. A trap comprising:
   a trap body;
   the body including a bottom member, a top member, a front member and a back member, a side member joining the members;
   the front member comprising a top, a notch, the notch being at the front member top, the front member further comprising an opening therethrough, the opening being closed by a trap door;
   the top member having at least one aperture therethrough, the at least one aperture being proximate to the notch, and a second aperture being positioned towards the back member;
   the trap door including an elongated slot therethrough, the slot comprising arcuate ends, the trap door being slidably retained between the front member and the body by a spacer;
   a bait holder;
     the bait holder being pivotably attached to the top member and extending within the body; and
   a trip mechanism, including a means for supporting the trap door, the trip mechanism in communication with the bait holder.

2. The trap as described in claim 1, wherein the arcuate ends are of different sizes.

3. The trap as described in claim 2, wherein the trip mechanism further comprises a rod.

4. The trap as described in claim 3, wherein the trip mechanism further includes a prop attached to the rod, the prop being sized to fit within the notch.

5. The trap as described in claim 4, wherein the trip mechanism further includes a weighted portion.

6. The trap as described in claim 5, wherein the bait holder further comprises a pair of support brackets, the support brackets attached to the top member on opposite sides of the second aperture, and the bait holder further comprises a boss, the boss being pivotably retained between the support brackets by a pivot pin received therethrough.

7. The trap as described in claim 6, wherein the bait holder further comprises a back member, a trip mechanism receiving means positioned on the back member and near the boss, and a second pivot pin, the trip mechanism receiving means further comprising a pair of walls, each wall having an opening therethrough, the trip mechanism receiving means receiving an end of the trip mechanism, and the second pivot pin pivotably retaining the trip mechanism between the walls.

8. The trap as described in claim 7, wherein the bait holder further comprises a bait chamber, the bait chamber further comprising a front member, a back member, a pair of side members, and a top that is open.

9. The trap as described in claim 8, wherein the bait chamber front member further comprises an opening therethrough.

10. The trap as described in claim 9, wherein the trap further comprises a means for retaining the trip mechanism, and wherein the means for retaining the trip mechanism is a loop attached to the trap body top member, between the bait holder and the trap door.

11. The trap as described in claim 10, wherein the body front member further comprises a second notch, the second notch being contiguous with the opening.

12. The trap as described in claim 11, wherein the trap door further comprises a lift knob.

13. The trap as described in claim 12, wherein the trip mechanism is received through the elongated slot.

14. The trap as described in claim 13, wherein the trap is manufactured from one or more materials selected from the group consisting of plastic, metal, steel, stainless steel, wire and mesh and combinations thereof.

15. A trap comprising:
   a trap body,
     the body including a bottom member, a top member, a front member and a back member, a side member joining the members;
   the front member comprising a top, a notch, the notch being at the front member top, the front member further comprising an opening therethrough, the opening being closed by a trap door;
   the top member having at least one aperture therethrough, the at least one aperture being proximate to the notch, and a second aperture being positioned towards the back member;
   the trap door being slidably retained between the front member and the body by a spacer, the trap door further including an elongated slot therethrough;
   a bait holder comprising:
     a pair of support brackets, the support brackets attached to the top member on opposite sides of the second aperture;
     a boss, the boss being pivotably retained between the support brackets by a pivot pin received therethrough;
     a back member including a trip mechanism receiving means near the boss, and a second pivot pin, the trip mechanism receiving means further comprising a pair of walls, each wall having an opening therethrough;
     the bait holder being pivotably attached to the top member and extending within the body; and
   a trip mechanism, comprising a rod having a first end received
in the trip mechanism receiving means, the second pivot pin pivotably retaining the trip mechanism between the walls;

the trip mechanism further comprising a prop, the prop attached to the rod, the prop being sized to fit within the notch and thereby supporting the trap door, and the rod second end being received through the elongated slot.

16. The trap as described in claim 15, wherein the front member further comprises a support, the support positioned between the trap door and the body.

17. The trap as described in claim 16, wherein the side member further comprises a slot, the slot proximate the front member, the slot being sized to receive and receiving the support therein.

18. The trap as described in claim 17, wherein the trap door further comprises a lift knob.

19. The trap as described in claim 18, further comprising a means for retaining the trip mechanism, and wherein the means for retaining the trip mechanism is a loop attached to the trap body top member, between the bait holder and the trap door.

20. The trap as described in claim 19, wherein the bait holder further comprises a bait chamber, the bait chamber further comprising a front member, a back member, a pair of side members, and a top that is open.

21. The trap as described in claim 20, wherein the trip mechanism further includes a weighted portion.

22. The trap as described in claim 21, wherein the body front member further comprises a second notch, and wherein the lift knob is sized to be slidably received, and can be slidably received, in the second notch.

23. The trap as described in claim 22, wherein the trap is manufactured from one or more materials selected from the group consisting of plastic, metal, steel, stainless steel, wire and mesh and combinations thereof.

24. A trap comprising:
   a trap body,
      the body including a bottom member, a top member, a front member and a back member, a side member joining the members;
   the front member comprising:
   a top and a notch, the notch being at the front member top,
   the front member further comprising an opening therethrough, the opening being closed by a trap door; and
   a second notch, the second notch being contiguous with the opening;
   the top member having at least one aperture therethrough, the at least one aperture being proximate to the notch, and a second aperture being positioned towards the back member;
   the trap door being slidably retained between the front member and the body by a spacer, the trap door further including an elongated slot therethrough, and a lift knob;
   the front member further comprising a support, the support positioned between the trap door and the body;
   the side member further comprising a slot, the slot proximate the front member, the slot being sized to receive and receiving the support therein;
   a bait holder comprising:
      a pair of support brackets, the support brackets attached to the top member on opposite sides of the second aperture;
      a boss, the boss being pivotably retained between the support brackets by a pivot pin received therethrough;
      a back member including a trip mechanism receiving means near the boss, and a second pivot pin, the trip mechanism receiving means further comprising a pair of walls, each wall having an opening therethrough;
      the bait holder being pivotably attached to the top member and extending within the body; and
   a trip mechanism, comprising a rod having a first end received in the trip mechanism receiving means, the second pivot pin pivotably retaining the trip mechanism between the walls;
   the trip mechanism further comprising a prop, the prop attached to the rod, the prop being sized to fit within the notch and thereby supporting the trap door, and the rod second end being received through the elongated slot.

25. The trap as described in claim 24, wherein the trap further comprises a means for retaining the trip mechanism, and wherein the means for retaining the trip mechanism is a loop attached to the trap body top member, between the bait holder and the trap door.

26. The trap as described in claim 25, wherein the bait holder further comprises a bait chamber, the bait chamber further comprising a front member, a back member, a pair of side members, and a top that is open.

27. The trap as described in claim 24, wherein the trip mechanism further includes a weighted portion.

28. The trap as described in claim 27, wherein the lift knob is sized to be slidably received, and can be slidably received, in the second notch.

29. The trap as described in claim 28, wherein the trap is manufactured from one or more materials selected from the group consisting of plastic, metal, steel, stainless steel, wire and mesh and combinations thereof.

* * * * *